(12) United States Patent
Galan et al.

(10) Patent No.: US 9,606,931 B2
(45) Date of Patent: Mar. 28, 2017

(54) INDICATING A LENGTH OF AN INSTRUCTION OF A VARIABLE LENGTH INSTRUCTION SET

(75) Inventors: Santiago Galan, Molins de Rei (ES); Roger Espasa, Barcelona (ES); Julio Gago, Barcelona (ES); Jose Gonzalez, Terrassa (ES)

(73) Assignee: Intel Corporation, Santa Clara, CA (US)

( * ) Notice: Subject to any disclaimer, the term of this patent is extended or adjusted under 35 U.S.C. 154(b) by 273 days.

(21) Appl. No.: 13/994,695

(22) PCT Filed: Dec. 29, 2011

(86) PCT No.: PCT/US2011/067809
§ 371 (c)(1),
(2), (4) Date: Jun. 14, 2013

(87) PCT Pub. No.: WO2013/101042
PCT Pub. Date: Jul. 4, 2013

(65) Prior Publication Data
US 2013/0262771 A1    Oct. 3, 2013

(51) Int. Cl.
*G06F 12/08* (2016.01)
*G06F 12/0875* (2016.01)
*G06F 9/30* (2006.01)
*G06F 9/38* (2006.01)

(52) U.S. Cl.
CPC ........ *G06F 12/0875* (2013.01); *G06F 9/3017* (2013.01); *G06F 9/30152* (2013.01); *G06F 9/382* (2013.01)

(58) Field of Classification Search
CPC .......................... G06F 9/30149; G06F 9/30152

USPC .......................................... 711/125; 712/208
See application file for complete search history.

(56) References Cited

U.S. PATENT DOCUMENTS

| 5,740,392 A * | 4/1998 | Brennan ........................ 712/210 |
| 6,253,309 B1 | 6/2001 | Mahalingaiah |
| 6,405,303 B1 | 6/2002 | Miller et al. |
| 6,460,116 B1 | 10/2002 | Mahalingaiah |

(Continued)

FOREIGN PATENT DOCUMENTS

| TW | 201042542 A | 12/2010 |
| TW | 201346732 A | 9/2015 |

OTHER PUBLICATIONS

PCT International Search Report for PCT Counterpart Application No. PCT/US2011/067809, 3 pgs., (Sep. 26, 2012).

(Continued)

*Primary Examiner* — Mark Giardino, Jr.
*Assistant Examiner* — Eric Loonan
(74) *Attorney, Agent, or Firm* — Nicholson De Vos Webster & Elliot LLP

(57) ABSTRACT

Some implementations disclosed herein provide techniques and arrangements for indicating a length of an instruction from an instruction set that has variable length instructions. A plurality of bytes that include an instruction may be read from an instruction cache based on a logical instruction pointer. A determination is made whether a first byte of the plurality of bytes identifies a length of the instruction. In response to detecting that the first byte of the plurality of bytes identifies the length of the instruction, the instruction is read from the plurality of bytes based on the length of the instruction.

18 Claims, 8 Drawing Sheets

(56) References Cited

U.S. PATENT DOCUMENTS

2010/0299501 A1 11/2010 McDonald et al.
2010/0299503 A1* 11/2010 McDonald et al. .......... 712/210

OTHER PUBLICATIONS

PCT Written Opinion of the International Searching Authority for PCT Counterpart Application No. PCT/US2011/067809, 3 pgs., (Sep. 26, 2012).
PCT Notification concerning Transmittal of International Preliminary Report on Patentability (Chapter I of the Patent Cooperation Treaty) for PCT Counterpart Application No. PCT/US2011/067809, 5 pgs., (Jul. 1, 2014).
Taiwan Patent Application No. 101147450, Search Report of R.O.C. dated Oct. 28, 2014.

* cited by examiner

INDICATING A LENGTH OF AN INSTRUCTION OF A VARIABLE LENGTH INSTRUCTION SET

CROSS-REFERENCE TO RELATED APPLICATIONS

This patent application is a U.S. National Phase Application under 35 U.S.C. §371 of International Application No. PCT/US2011/067809, filed Dec. 29, 2011, entitled INDICATING A LENGTH OF AN INSTRUCTION OF A VARIABLE LENGTH INSTRUCTION SET.

TECHNICAL FIELD

Some embodiments of the invention generally relate to the operation of processors. More particularly, some embodiments of the invention relate to indicating a length of an instruction of a variable length instruction set.

BACKGROUND

A processor may have an associated instruction set that includes instructions that the processor is capable of executing. In some cases, the instruction set may include variable length instructions, e.g., at least one of the instructions may have a length that is different from another instruction in the instruction set. To illustrate, at least some of the instructions in the instruction set may include instructions that are executable by a previous generation of the processor, to enable backward compatibility with the previous generation processor. Determining a length of each instruction may consume time (e.g., processor cycles), power, or both.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Pre-Decode Unit

Figure 1:
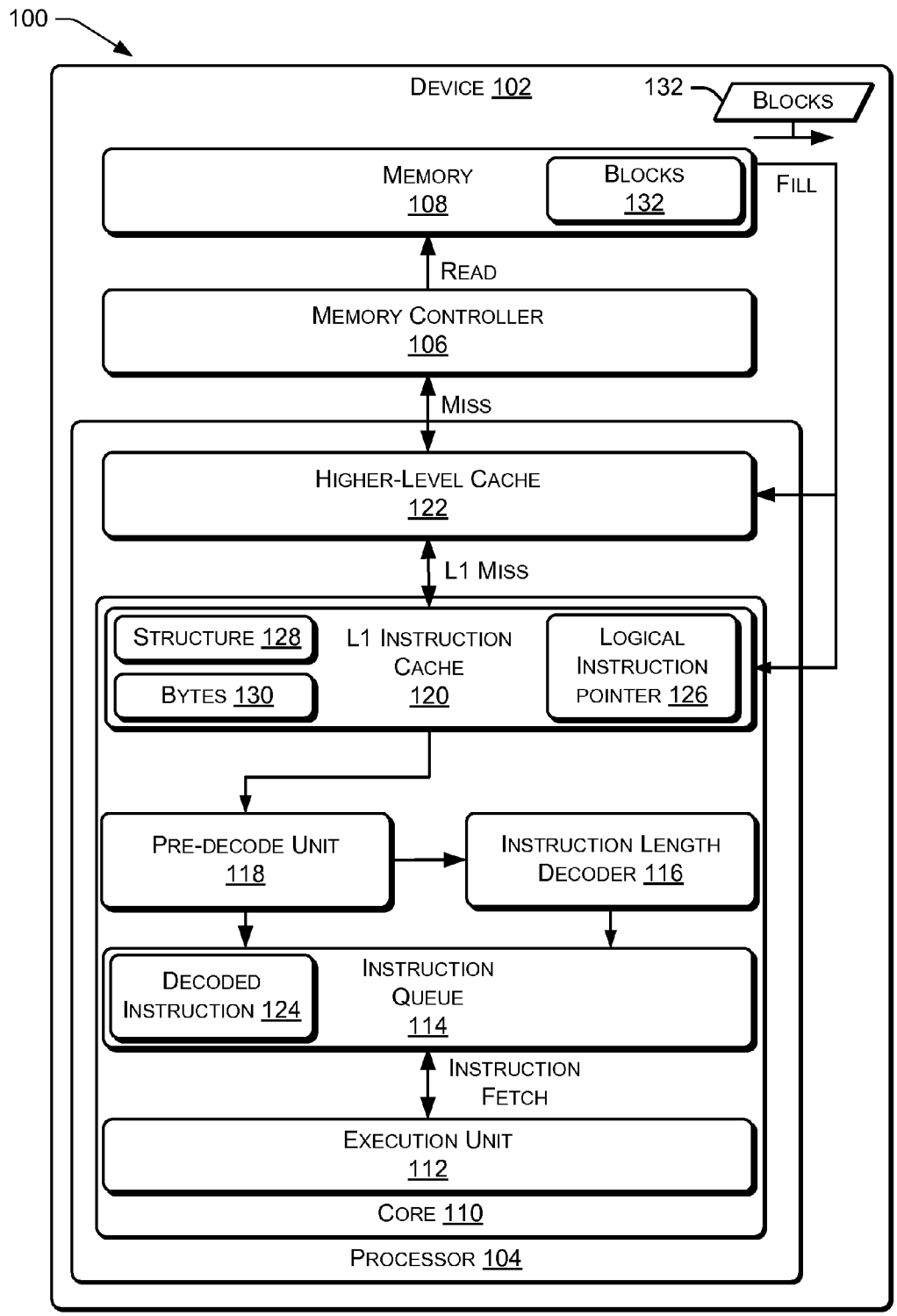
FIG. 1 illustrates an example framework that includes a pre-decode unit and an instruction length decoder according to some implementations.

The technologies described herein generally relate to identifying a length of an instruction from a variable length instruction set. A processor may be capable of executing an instruction set that includes variable length instructions (e.g., at least one instruction of the instruction set has a length that is different from another instruction of the instruction set). The processor may include an instruction length decoder to read multiple bytes from an instruction cache, determine a length of an instruction that is included in the multiple bytes, and decode (e.g., extract) the instruction from the multiple bytes. Determining the length of the instruction may consume time, power, or both. For example, multiple clock cycles may be used to determine the length of the instruction.

When the processor is executing a thread, one or more instructions may be repeatedly executed, such as when the one or more instructions are part of an iterative process or when the one or more instructions are the destination of a frequently executed branch operation. In this example, the instruction length decoder may repeatedly decode the length of those instructions that are repeatedly being executed by the processor during execution of the thread. For example, if a particular instruction is executed ten times in a sixty-second time period, the instruction length decoder may determine the length of the particular instruction ten times during the sixty-second time period.

To address these types of situations, after computing the length of an instruction, the instruction length decoder may modify one or more of the bytes in which the instruction is encoded to include the length of the instruction. For example, in some cases, the instruction may include one or more prefix bytes. The prefix bytes may modify a behavior of an instruction. For example, the prefix bytes may change a default register of an instruction, override a default size of a machine-word, control looping in a string instruction, control bus usage, modify other instruction-related behavior, or any combination thereof. The multiple bytes in the instruction cache may include both the prefix bytes and the instruction. After determining the length of the instruction, the instruction length decoder may modify at least one of the prefix bytes to include the length of the instruction.

A pre-decode unit may be used to read multiple bytes from the instruction cache. The pre-decode unit may determine whether a byte from the multiple bytes includes the length of the instruction (e.g., were the multiple bytes previously modified to include the length). If the byte includes the length, the pre-decode unit may extract the instruction from the multiple bytes based on the length of the instruction. If the byte does not include (e.g., excludes) the length of the instruction, the pre-decode unit may send the multiple bytes to the instruction length decoder to determine the length of the instruction. The byte may exclude the length of the instruction (a) if the instruction length decoder has not determined the length of the instruction or (b) if the instruction length was previously determined but the multiple bytes (e.g., that include the instruction and the length) were flushed from the instruction cache. For example, the multiple bytes that include the instruction and the length may be flushed from the instruction cache if an amount of time that has elapsed since the multiple bytes were last accessed satisfies a threshold.

Thus, a pre-decode unit may read multiple bytes from an instruction cache and determine if a byte from the multiple bytes includes a length of an instruction. If the byte includes the length, the pre-decode unit may extract (e.g., decode) the instruction from the multiple bytes and place the instruction in an instruction queue for execution by a processor. If the byte does not include the length, the pre-decode unit may send the multiple bytes to an instruction length decoder. The instruction length decoder may determine the length of the instruction based on predetermined rules and modify one of the multiple bytes to include the length for subsequent accesses. After determining the length of the instruction, the instruction length decoder may extract the instruction from the multiple bytes based on the length and place the instruction in the instruction queue for execution by a processor. When the pre-decode unit subsequently reads the multiple bytes, the pre-decode unit may determine that the multiple bytes include the length of the instruction and extract the instruction from the multiple bytes based on the length. In this way, the length of each instruction may be determined once (e.g., rather than repeatedly) during the time that each instruction is stored in the instruction cache, thereby reducing the time and/or power consumed by the instruction length decoder to repeatedly determine the length.

FIG. 1 illustrates an example framework 100 that includes a pre-decode unit and an instruction length decoder according to some implementations. The framework 100 includes a device 102, such as a desktop computing device, laptop computing device, wireless computing device, and the like. The device 102 may include a processor 104, a memory controller 106, and a memory 108. The memory controller 106 may be used to access the memory 108 by reading from the memory 108 or writing to the memory 108. The memory 108 may include read only memory (ROM), random access memory (RAM), disk storage, other types of memory, or any combination thereof.

The processor 104 may include one or more cores, such as a core 110. The core 110 may include an execution unit 112, an instruction queue 114, an instruction length decoder 116, a pre-decode unit 118, and a level one (L1) instruction cache 120. The processor 104 may also include one or more caches, such as a higher-level cache 122. In some implementations the higher-level cache 122 may be a level two (L2) cache while in other implementations the higher-level cache may be a last-level cache (LLC). The device 102 may include additional caches, such as an L1 data cache, but are not illustrated in FIG. 1 for the sake of clarity. The instruction queue 114 may be used to queue one or more instructions, such as a decoded instruction 124, for execution by the execution unit 112. The execution unit 112 may have an associated instruction set that includes instructions that the execution unit 112 is capable of executing. The instruction set may include variable length instructions, e.g., a first instruction of the instruction set may have a first length and a second instruction of the instruction set may have a second length that is different from the first length.

During execution of instructions in the instruction queue 114, the execution unit 112 may request an instruction from the instruction queue 114 by performing an instruction fetch. For example, while executing a set of instructions, a branch operation may cause the execution unit 112 to fetch (e.g., request) the instruction. If the instruction is not in the instruction queue 114, the pre-decode unit 118 may determine whether the instruction is in the L1 instruction cache 120.

The pre-decode unit 118 may use a logical instruction pointer 126 to read a structure 128 from the L1 instruction cache 120. The structure 128 may be associated with one or more bytes 130 that are to be read from the L1 instruction cache 120. The logical instruction pointer 126 may point to the bytes 130, the associated structure 128, or both. The bytes 130 may include an instruction, such as the instruction requested by the execution unit 112. The structure 128 may indicate whether the associated bytes 130 include a length of the instruction.

Figure 2:
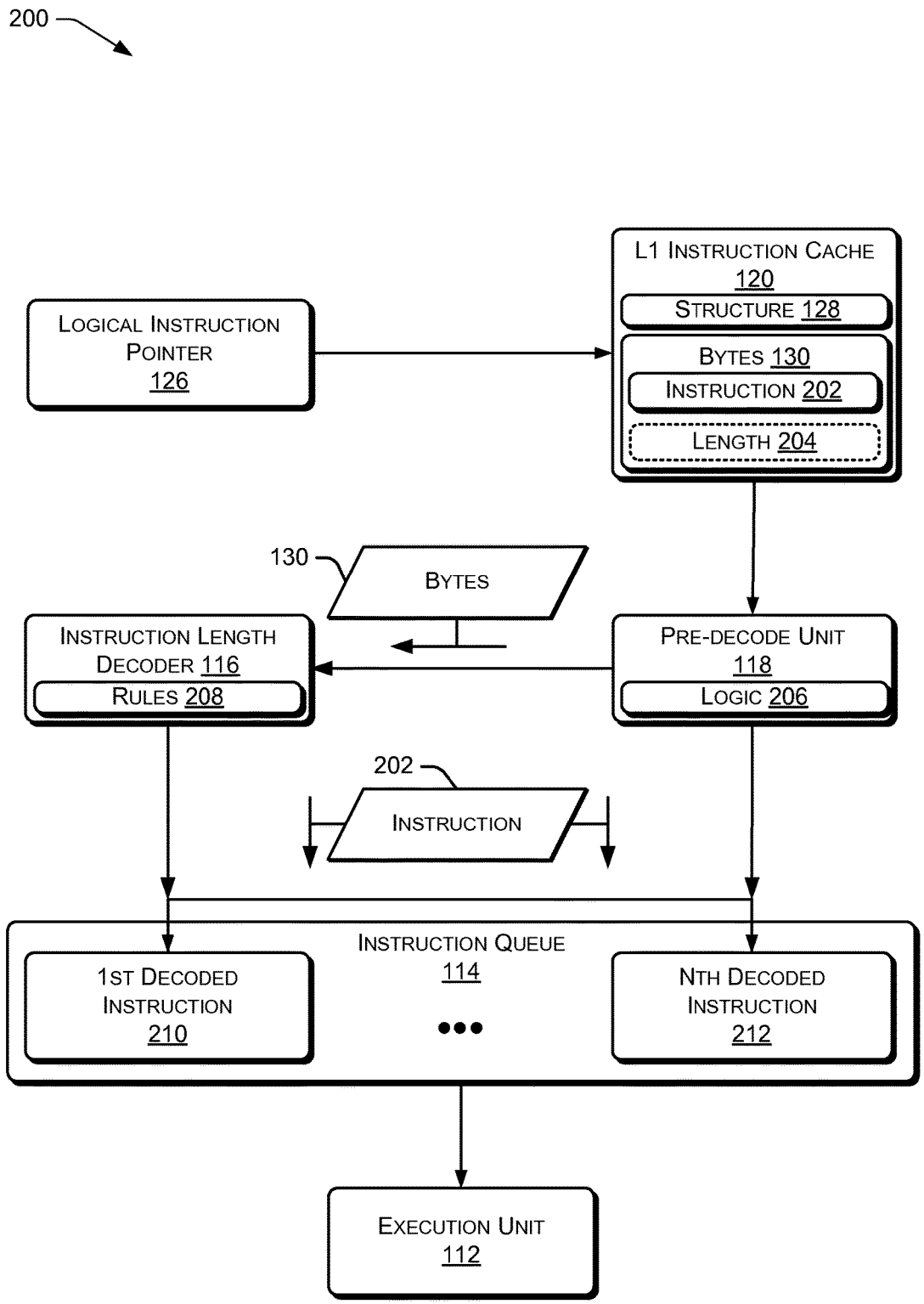
FIG. 2 illustrates an example framework that includes decoded instructions according to some implementations.

The structure 128 may be implemented using a number of different schemes. For example, in some implementations, the structure 128 may include a single bit to indicate whether a particular byte of the bytes 130 includes a length of an instruction in the bytes 130. In other implementations, the structure 128 may include two or more bits. For example, in a two-bit scheme, a first bit may be used to indicate whether a particular byte of the bytes 130 includes a length of an instruction and a second bit may be used to indicate whether the length is encoded in a prefix byte of the instruction. Of course, other schemes may be used with the structure 128 to identify whether or not the bytes 130 include a length of an instruction that is encoded in the bytes 130. In some of these other schemes, the structure 128 may include more than one bit. In FIG. 2, the structure 128 is shown as separate from the bytes 130. However, in some implementations, the bytes 130 may be modified to include the structure 128. For example, the bytes 130 may include a prefix byte and an instruction. The prefix byte may be modified to include the structure 128.

If the structure 128 indicates that the length of the instruction is included in the bytes 130, the pre-decode unit 118 may determine the length of the instruction, decode the instruction from the bytes 130 based on the length, and place the decoded instruction 124 in the instruction queue 114 for execution as the next instruction by the execution unit 112. If the structure 128 does not indicate the length of the instruction that is encoded in the bytes 130, the pre-decode unit 118 may instruct the instruction length decoder 116 to determine the length of the instruction. The instruction length decoder 116 may determine the length of the instruction, decode the instruction from the bytes 130 based on the length, and place the decoded instruction 124 in the instruction queue 114 for execution as the next instruction by the execution unit 112.

After determining the length of the instruction, the instruction length decoder 116 may modify at least one of the bytes 130 to include the length of the instruction. The instruction length decoder 116 may modify the structure 128 to indicate that at least one of the bytes 130 has been modified to include the length of the instruction. For example, the structure 128 may be modified to indicate that at least one of the bytes 130 has been modified to include the length of the instruction Subsequently, if the execution unit 112 requests the instruction from the L1 instruction cache 120, the pre-decode unit 118 may determine (e.g., based on the structure 128) that the bytes 130 include the length of the instruction and decode (e.g., extract) the instruction from the bytes 130. In this way, during a particular time period in which the bytes 130 are resident in the L1 instruction cache 120, the length of an instruction encoded in the bytes 130 may be determined by the instruction length decoder 116 when the instruction is initially requested. Subsequent requests for the instruction from the L1 instruction cache 120 during the particular time period may result in the pre-decode unit 118 determining the length of the instruction from one of the bytes 130 and extracting the instruction from the bytes 130 based on the length, without invoking the instruction length decoder 116.

In some implementations, the pre-decode unit 118 and the instruction length decoder 116 may operate in parallel (e.g., substantially contemporaneously). For example, the pre-decode unit 118 may read the structure 128 substantially at the same time that the instruction length decoder 116 reads the bytes 130. The pre-decode unit 118 may determine whether one of the bytes 130 includes a length of an instruction and may instruct the instruction length decoder 116 to determine the length of the instruction if the bytes 130 exclude the length of the instruction. In other implementations, the pre-decode unit 118 and the instruction length decoder 116 may operate in a serial manner. For example, an implementation in which the pre-decode unit 118 and the instruction length decoder 116 operate serially may consume less power as compared to an implementation in which the pre-decode unit 118 and the instruction length decoder 116 operate in parallel.

If an instruction requested by the execution unit 112 is not in the L1 instruction cache 120, an L1 miss may occur, and the instruction may be requested from the higher-level cache 122. If the instruction is included in the higher-level cache 122, the instruction may be provided to the L1 instruction cache 120. If the instruction is not included in the higher-level cache 122, a miss may occur and the memory controller 106 may read one or more blocks 132 from the memory 108 and fill the blocks 132 into one or more of the caches 120 or 122. For example, if the higher-level cache 122 is inclusive of the L1 instruction cache 120, the blocks 132 may be filled into both the caches 120 and 122. As another example, if the higher-level cache 122 is exclusive of the L1 instruction cache 120, the blocks 132 may be filled into the L1 instruction cache 120.

Thus, the instruction length decoder 116 may determine a length of a particular instruction that is encoded in the bytes 130 after the particular instruction is requested by the execution unit 112. The instruction length decoder 116 may modify at least one of the bytes 130 (e.g., a prefix byte) to include the length of the particular instruction and may modify the structure 128 to indicate that at least one of the bytes 130 include the length of the particular instruction. Subsequently, if the execution unit 112 requests the particular instruction, the pre-decode unit 118 may determine, based on the structure 128, that the bytes 130 include the length of the particular instruction and decode (e.g., extract) the particular instruction from the bytes 130. In this way, subsequent requests for the particular instruction from the L1 instruction cache 120 during the time that the instruction is resident in the L1 instruction cache 120 may result in the pre-decode unit 118 extracting the instruction from the bytes 130 based on the previously determined length that was stored in the bytes 130. The instruction may be extracted from the bytes 130 without repeatedly determining the length of the instruction during the time that the bytes 130 are resident in the L1 instruction cache 120.

FIG. 2 illustrates an example framework 200 that includes decoded instructions according to some implementations. The framework 200 includes the execution unit 112, the instruction queue 114, the instruction length decoder 116, the pre-decode unit 118, the instruction cache 120, and the logical instruction pointer 126, from the core 110 of FIG. 1.

The logical instruction pointer 126 may point to a set of bytes 130 that are to be read from the L1 instruction cache 120. The bytes 130 may include an instruction 202. The structure 128 may be associated with at least one of the bytes 130 and may indicate whether or not the bytes include a length 204 of the instruction 202. The structure 128 may be implemented using one or more bits. For example, a first bit in the structure 128 may indicate whether the bytes 130 include the length 204 while one or more additional bits in the structure 128 may identify a location of the length 204 in the bytes 130. For example, the one or more additional bits may indicate whether or not the length 204 is included in a prefix byte of the instruction 202. In some implementations, the structure 128 may include one bit for each byte in the instruction 202.

The pre-decode unit 118 may include logic 206, such as hardware logic or logical instructions that are executable by the processor 104, to perform various functions. For example, the logic 206 may read the structure 128 from the L1 instruction cache 120 associated with the bytes 130 based on the logical instruction pointer 126. The logic 206 may determine whether the bytes 130 include the length 204 based on the structure 128. If the structure 128 indicates that the length 204 of the instruction 202 is included in the bytes 130, the logic 206 may extract (e.g., decode) the length 204 from the bytes 130 and decode the instruction 202 from the bytes 130 based on the length 204 (e.g., by reading a number of the bytes 130 from the instruction cache 120 that correspond to the length 204). If the structure 128 indicates that the bytes 130 do not include (e.g., exclude) the length 204, the logic 206 may instruct the instruction length decoder 116 to determine the length 204 of the instruction 202.

The instruction length decoder 116 may read the bytes 130 from the instruction cache 120, determine the length 204 of the instruction 202, and decode the instruction 202 from the bytes 130 based on the length 204. In some implementations, determine the length 204 of the instruction 202 may consume multiple operating cycles of the execution unit 112. The instruction length decoder 116 may use one or more predetermined rules 208 to determine the length 204 of the instruction 202. To illustrate, an instruction set that includes instructions that the execution unit 112 is capable of executing may vary in length from one byte to fifteen bytes or more. Instructions may vary in size because (i) an operational code ("opcode") in each instruction may vary in size, (ii) some instructions may have an associated prefix while other instructions may have an associated prefix, (iii) the prefix may vary in size depending on the opcode, or any combination thereof.

The pre-decode unit 118 or the instruction length decoder 116 may decode the instruction 202 from the bytes 130 and place the instruction in the instruction queue 114. The instruction queue 114 may include multiple instructions, such as a first decoded instruction 210 and an $N^{th}$ decoded instruction 212, where N is greater than one. The decoded instructions 210 and 212 may be fetched from the instruction queue 114 for the execution by the execution unit 112.

After determining the length 204, the instruction length decoder 116 may modify at least one of the bytes 130 to include the length 204. The instruction length decoder 116 may modify the structure 128 to indicate that the bytes 130 include the length 204 of the instruction 202. For example, the structure 128 may be modified to indicate that a prefix byte from the bytes 130 includes the length 204. If the pre-decode unit 118 subsequently receives requests for the instruction 202 from the L1 instruction cache 120, the logic 206 may determine (e.g., based on the structure 128) that the bytes 130 include the length 204 and decode (e.g., extract) the instruction 202 from the bytes 130. In this way, during a particular time period in which the bytes 130 are resident in the L1 instruction cache 120, the length 204 may be determined by the instruction length decoder 116 when the instruction 202 is initially requested and subsequent requests for the instruction from the L1 instruction cache 120 may result in the logic 206 determining the length 204 from the bytes 130.

In some implementations, the pre-decode unit 118 and the instruction length decoder 116 may operate in parallel (e.g., substantially contemporaneously). For example, the pre-decode unit 118 may read the structure 128 substantially at the same time that the instruction length decoder 116 reads the bytes 130. The pre-decode unit 118 may determine whether the bytes 130 include the length 204 and may instruct the instruction length decoder 116 to determine the length 204 if the bytes 130 exclude the length 204.

Thus, in response to the execution unit 112 requesting the instruction 202, the instruction length decoder 116 may determine the length 204 of the instruction 202 that is encoded in the bytes 130. The instruction length decoder 116 may modify the bytes 130 to include the length 204 of the instruction 202 and may modify the structure 128 to indicate that the bytes 130 include the length 204. Subsequently, when the execution unit 112 requests the instruction 202, the pre-decode unit 118 may determine, based on the structure 128, that the bytes 130 include the length 204 and decode (e.g., extract) the instruction 202 from the bytes 130 based on the length 204. In this way, subsequent requests to fetch the instruction 202 from the L1 instruction cache 120 during the time that the instruction 202 is resident in the L1 instruction cache 120 may result in the pre-decode unit 118 decoding the instruction 202 from the bytes 130 based on the previously determined length 204.

Figure 3:
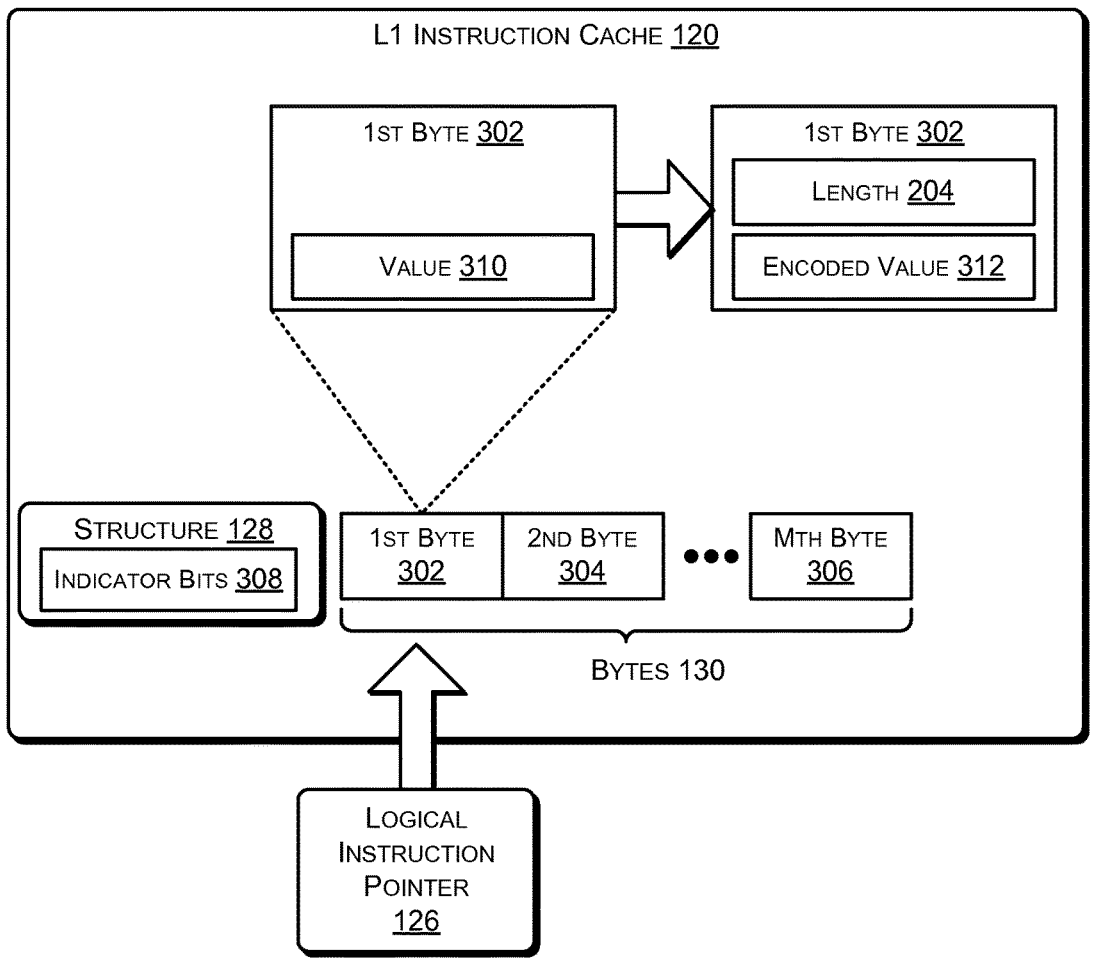
FIG. 3 illustrates an example framework that includes an instruction cache according to some implementations.

FIG. 3 illustrates an example framework 300 that includes an instruction cache according to some implementations. The logical instruction pointer 122 may point to the bytes 130 that are to be read from the L1 instruction cache 120. The bytes 130 may include a first byte 302, a second byte 304, and additional bytes, up to and including an $M^{th}$ byte 306, where M is greater than two. For example, in some implementations, the bytes 130 may include sixteen bytes (e.g., M=16). The structure 128 may be associated with one of more of the bytes 302, 304, or 306 and may include one or more indicator bits 308. The indicator bits 308 may indicate whether the bytes 130 include the length 204 of instruction 202 of FIG. 2. The indicator bits 308 may indicate which of the bytes 302, 304, or 306 include the length 204.

In some implementations, the first byte 302 may be a prefix byte. For example, the bytes 302, 304, and 306 may include an instruction that has one or more prefix bytes. If the first byte 302 is a prefix byte of an instruction (e.g., the instruction 202), the first byte 302 may have a value 310 that is part of the prefix of the instruction. To enable the first byte to include the length 204 of the instruction and the value 310 that is part of the prefix, the value 310 may be encoded using an encoding scheme to create an encoded value 312. For example, after determining the length 204 of the instruction 202, the instruction length decoder 116 of FIG. 2 may determine the value 310 of the first byte 302, create the encoded value 312, and modify the first byte 302 to include both the length 204 of the instruction and the encoded value 312.

Thus, if the first byte 302 is a prefix byte of an instruction (e.g., the instruction 202), the first byte 302 may be modified to include the length 204 and an encoded value 312 that encodes the original value 310 of the first byte 302. By modifying the prefix byte of the instruction to include the length of the instruction, the length of the instruction can be included in the bytes 130 without adding additional bytes. In this way, minor modifications may be made to the architecture of the processor 104 of FIG. 1 to enable identifying the length of an instruction in the bytes 130. Because additional bytes are not added, computational overhead resulting from modifying the first byte 302 to include the length 204 and the encoded value 312 is relatively small and is more than offset by not using the instruction length decoder 116 to repeatedly determine the length of an instruction that is repeatedly fetched for execution.

Example Processes

The flow diagrams illustrated in FIGS. 4, 5, 6, and 7 describe processes for determining whether bytes that include an instruction also include a length of the instruction. In the flow diagrams of FIGS. 4, 5, 6, and 7, each block represents one or more operations that can be implemented in hardware, firmware, software, or a combination thereof. The processes described in FIGS. 4, 5, 6, and 7 may be performed by one or more of the instruction queue 114, the instruction length decoder 116, the pre-decode unit 118, or the L1 instruction cache 120. In the context of hardware, the blocks represent hardware logic that is configured to perform the recited operations. In the context of firmware or software, the blocks represent computer-executable instructions that, when executed by the processor, cause the processor to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400, 500, 600, and 700 are described with reference to one or more of the frameworks 100, 200, and 300 described above, although other models, frameworks, systems and environments may be used to implement these processes.

Figure 4:
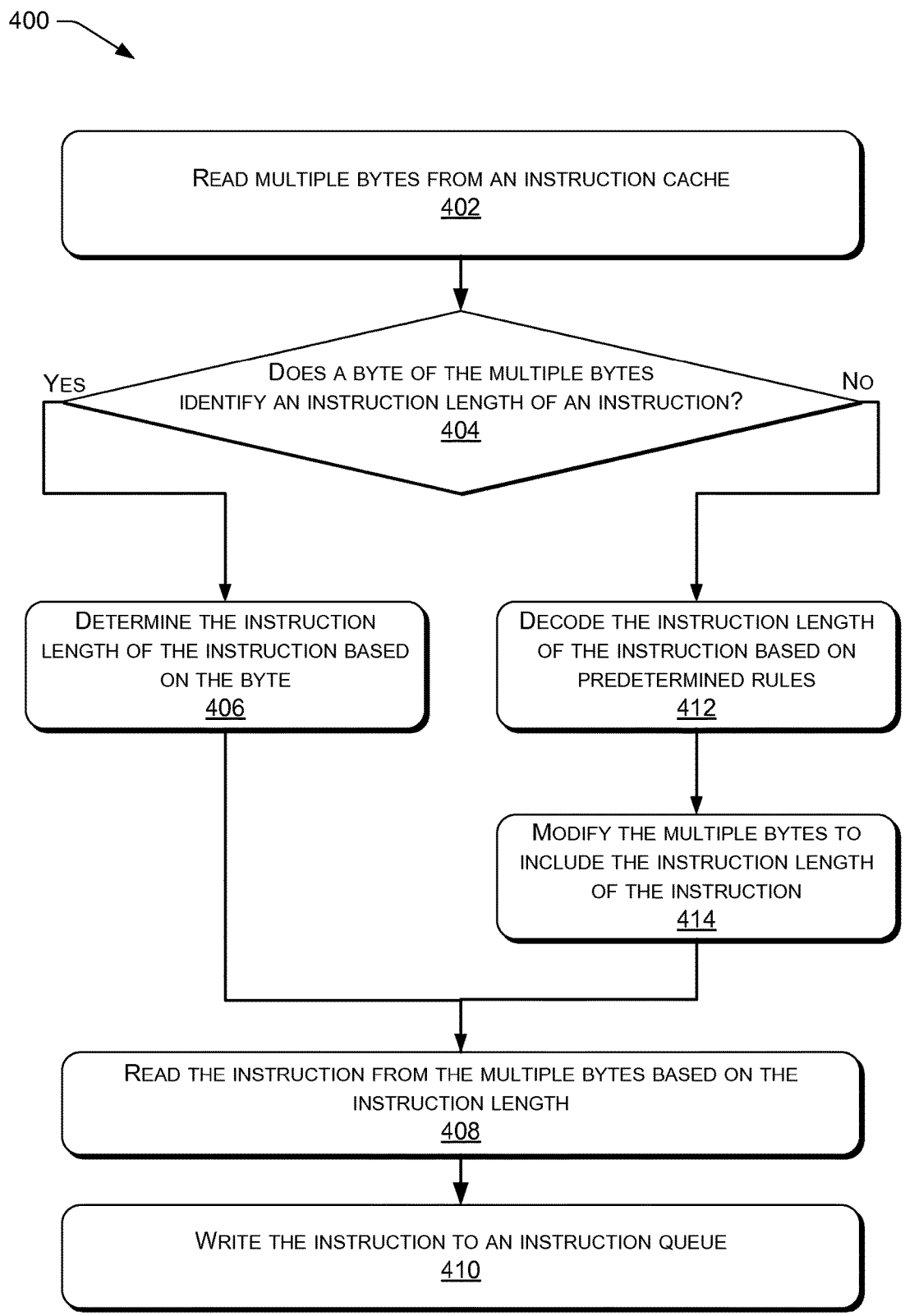
FIG. 4 illustrates a flow diagram of an example process that includes reading multiple bytes from an instruction cache according to some implementations.

FIG. 4 illustrates a flow diagram of an example process that includes reading multiple bytes from an instruction cache according to some implementations.

At block 402, multiple bytes may be read from an instruction cache. At block 404, a determination may be made whether a byte of the multiple bytes identifies an instruction length of an instruction. For example, in FIG. 2, the pre-decode unit 118 may read the bytes 130 and determine if the bytes 130 include the length 204 of the instruction 202.

If, at 404, a byte of the multiple bytes identifies the instruction length of the instruction, then the instruction length of the instruction may be determined based on the byte, at 406. At 408, the instruction may be read from the multiple bytes based on the instruction length. For example, in FIG. 2, if the pre-decode unit 118 determines that the bytes 130 include the length 204, the pre-decode unit 118 may determine the length 204 from the bytes 130 and read the instruction 202 from the bytes 130 based on the length 204. To illustrate, if the length 204 indicates that the instruction is ten bytes long, the pre-decode unit 118 may read ten of the bytes 130 from the instruction cache 120.

At 410, the instruction may be written to an instruction queue. For example, in FIG. 2, the pre-decode unit 118 may write the instruction 202 to the instruction queue 114.

If, at 404, a byte of the multiple bytes does not identify (e.g., excludes) the instruction length of the instruction, then the instruction length of the instruction may be decoded based on pre-determined rules, at 412. At 414, the multiple bytes may be modified to include the instruction length of the instruction. For example, in FIG. 2, the instruction length decoder 116 may determine the length 204 of the instruction 202 based on the rules 208 and modify the bytes 130 to include the length 204. To illustrate, in FIG. 3, the instruction length decoder 116 may modify the first byte 302 to include the length 204 and the encoded value 312.

At 408, the instruction may be read from the multiple bytes based on the instruction length. For example, in FIG. 2, after the instruction length decoder 116 determines the length 204, the instruction 202 may be decoded (e.g., extracted) from the bytes 130 based on the length 204. At 410, the instruction may be written to an instruction queue. For example, in FIG. 2, the pre-decode unit 118 may write the instruction 202 to the instruction queue 114.

Figure 5:
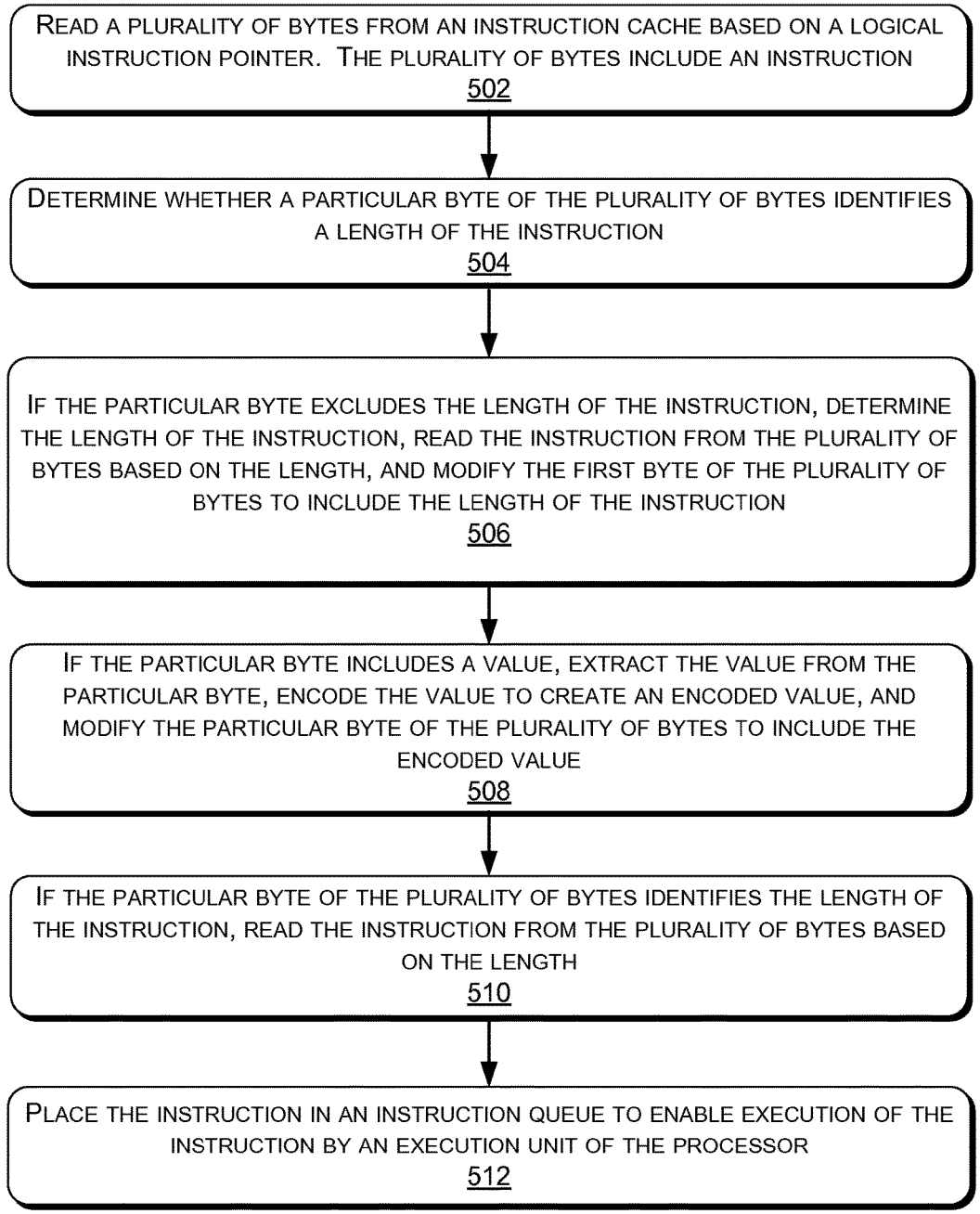
FIG. 5 illustrates a flow diagram of an example process that includes determining whether a particular byte read from an instruction cache identifies a length of an instruction according to some implementations.

FIG. 5 illustrates a flow diagram of an example process that includes determining whether a particular byte read from an instruction cache identifies a length of an instruction according to some implementations.

At block 502, a plurality of bytes that include an instruction may be read from an instruction cache based on a logical instruction pointer. At block 504, a determination may be made whether a particular byte of the plurality of bytes identifies a length of the instruction. For example, in FIG. 2, the pre-decode unit 118 may read the bytes 130 based on the logical instruction pointer 126 and determine if the bytes 130 include the length 204 of the instruction 202.

At 506, if the particular byte of the plurality of bytes excludes the length of the instruction, the length of the instruction may be determined, the instruction may be read from the plurality of bytes based on the length, and the particular byte of the plurality of bytes may be modified to include the length of the instruction. For example, in FIG. 2, if the bytes 130 do not include the length 204, the instruction length decoder 116 may determine the length 204 of the instruction 202 and modify the bytes 130 to include the length 204.

At 508, if the particular byte includes a value, the value may be extracted from the particular byte, the value may be encoded to create an encoded value, and the particular byte of the plurality of bytes may be modified to include the encoded value. In some implementations, the particular byte may comprise a prefix byte of an instruction. For example, in FIG. 3, the instruction length decoder 116 may extract the value 310 from the first byte 302, encode the value 310 to create the encoded value 312, and modify the first byte 302 to include the encoded value 312.

At 510, if the particular byte of the plurality of bytes identifies the instruction length of the instruction, then the instruction may be read from the plurality of bytes based on the length. For example, in FIG. 2, the pre-decode unit 118 may read the instruction 202 from the bytes 130 based on the length 204.

At 512, the instruction may be placed in an instruction queue to enable execution of the instruction by an execution unit of a processor. For example, in FIG. 2, the pre-decode unit 118 or the instruction length decoder 116 may place the instruction 202 in the instruction queue 114 for execution by the execution unit 112.

Figure 6:
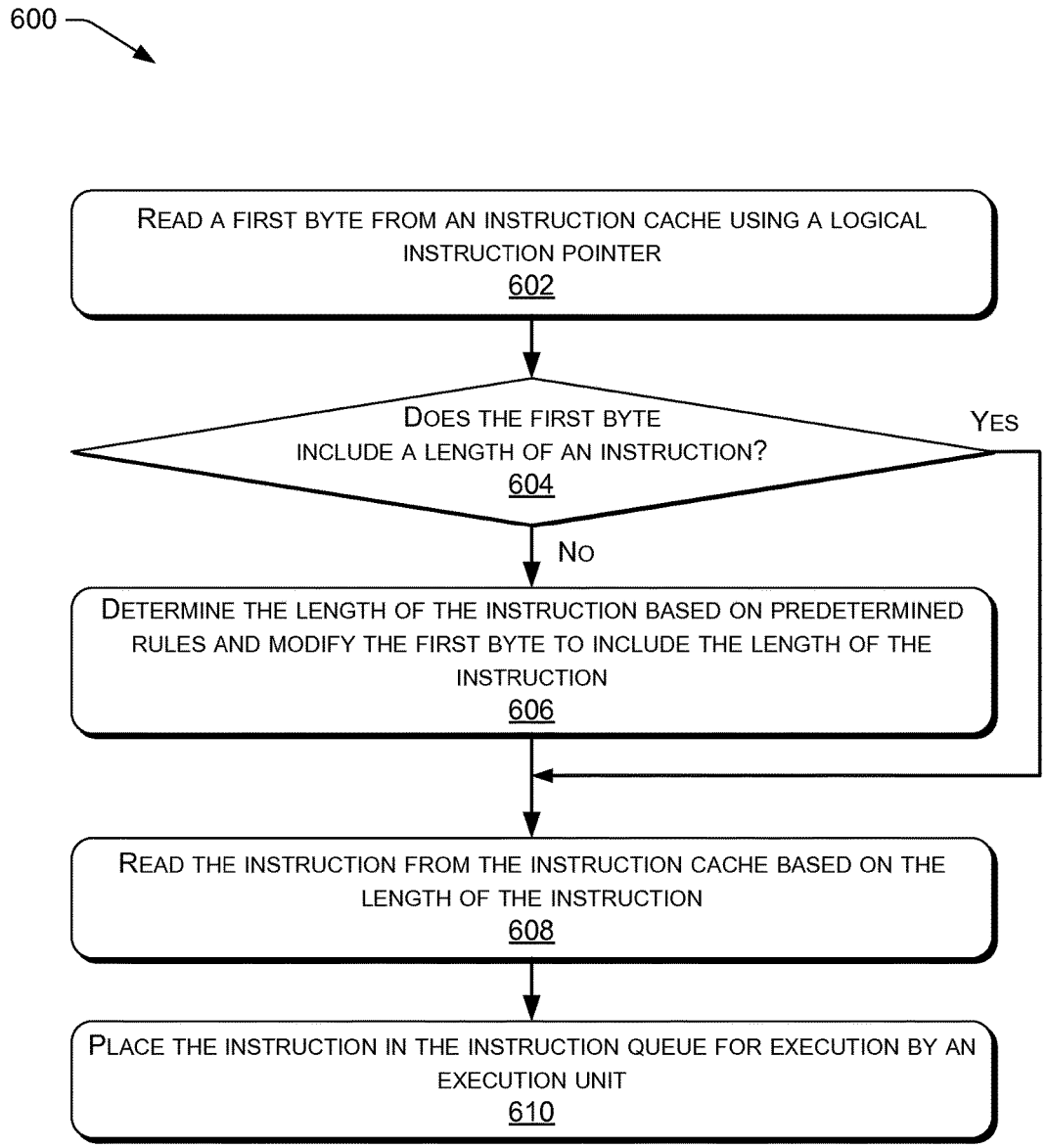
FIG. 6 illustrates a flow diagram of an example process that includes determining a length of an instruction based on predetermined rules according to some implementations.

FIG. 6 illustrates a flow diagram of an example process that includes determining a length of an instruction based on predetermined rules according to some implementations.

At block 602, a first byte may be read from an instruction cache using a logical instruction pointer. At block 404, a determination may be made whether the first byte includes a length of an instruction. For example, in FIG. 2, the pre-decode unit 118 may read a first byte of the bytes 130 based on the logical instruction pointer 126 and determine if the first byte includes the length 204 of the instruction 202.

If, at 604, the first byte excludes the length of the instruction, then the length of the instruction may be determined based on predetermined rules and the first byte may be modified to include the length of the instruction, at 606, and the process proceeds to 608. For example, in FIG. 2, the instruction length decoder 116 may determine the length 204 of the instruction 202 based on the rules 208 and modify the bytes 130 to include the length 204. To illustrate, in FIG. 3, the instruction length decoder 116 may modify the first byte 302 to include the length 204. If, at 604, the first byte includes the length of the instruction, then the process proceeds to 608.

At 608, the instruction may be read from the instruction cache based on the length of the instruction. For example, in FIG. 2, if the bytes 130 include the length 204, the instruction 202 may be decoded (e.g., extracted) from the bytes 130 based on the length 204.

At 610, the instruction may be placed in an instruction queue for execution by an execution unit of a processor. For example, in FIG. 2, the pre-decode unit 118 or the instruction length decoder 116 may place the instruction 202 in the instruction queue 114 for execution by the execution unit 112.

Figure 7:
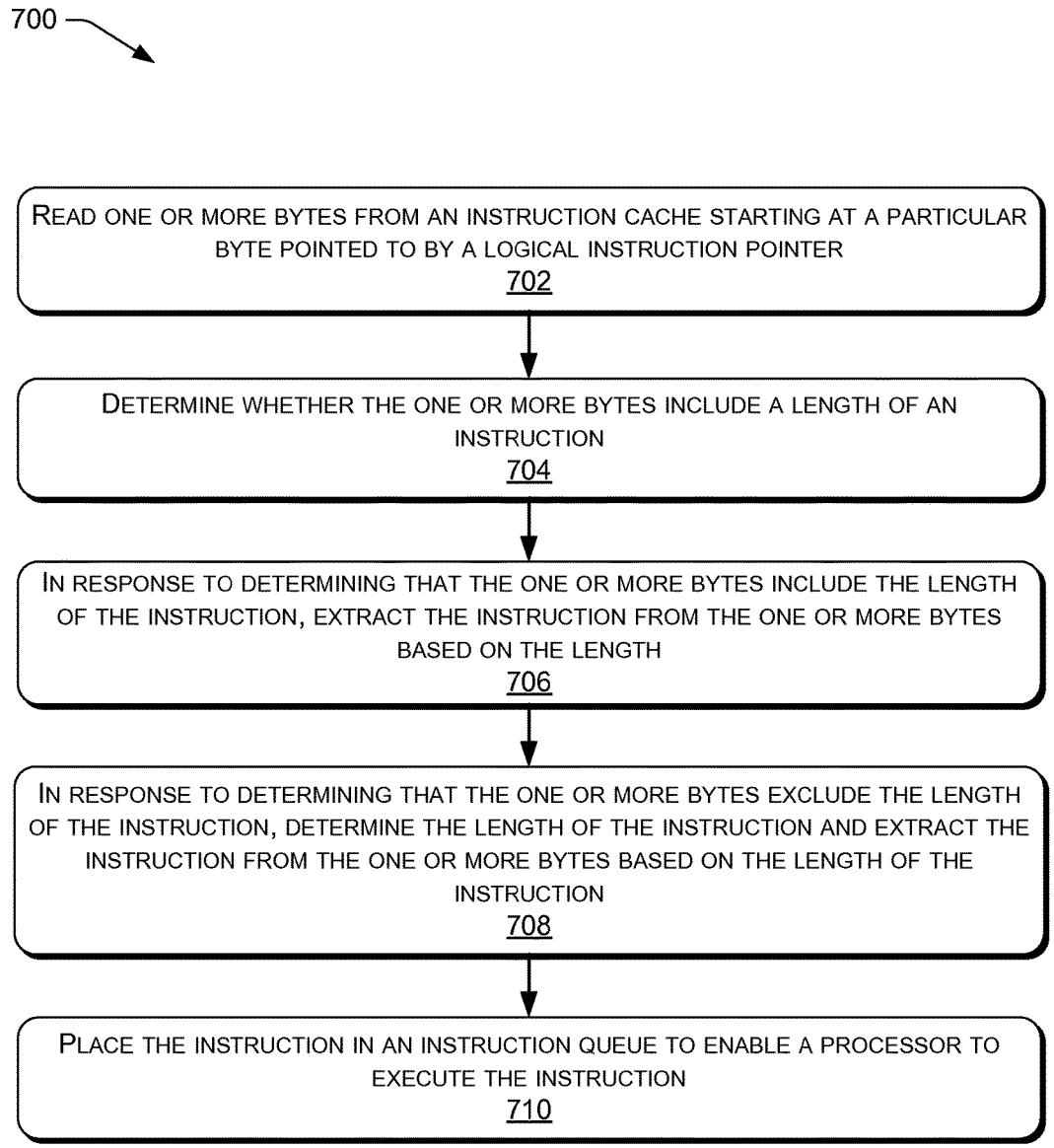
FIG. 7 illustrates a flow diagram of an example process that includes reading one or more bytes from an instruction cache starting at a particular byte pointed to by a logical instruction pointer according to some implementations.

FIG. 7 illustrates a flow diagram of an example process that includes reading one or more bytes from an instruction cache starting at a particular byte pointed to by a logical instruction pointer according to some implementations.

At block 702, one or more bytes may be read from an instruction cache starting at a particular byte pointed to by a logical instruction pointer. At block 704, a determination may be made whether the one or more bytes include a length of an instruction. For example, in FIG. 2, the pre-decode unit 118 may read the bytes 130 based on the logical instruction pointer 126 and determine if the bytes 130 include the length 204 of the instruction 202.

At 706, in response to determining that the one or more bytes include the length of the instruction, the instruction may be extracted from the one or more bytes based on the length. For example, in FIG. 2, if the bytes 130 include the length 204, the pre-decode unit 118 may extract the instruction 202 from the bytes 130 based on the length 204.

At 708, in response to determining that the one or more bytes exclude the length of the instruction, the length of the instruction may be determined and the instruction may be extracted from the one or more bytes based on the length of the instruction. For example, in FIG. 2, if the bytes 130 exclude the length 204, the instruction length decoder 116 may determine the length 204 of the instruction 202 and extract the instruction 202 from the bytes 130 based on the length 204. The bytes 130 may be modified to include the length 204.

At 710, the instruction may be placed in an instruction queue to enable a processor to execute the instruction. For example, in FIG. 2, the pre-decode unit 118 or the instruction length decoder 116 may place the instruction 202 in the instruction queue 114 for execution by the execution unit 112.

Figure 8:
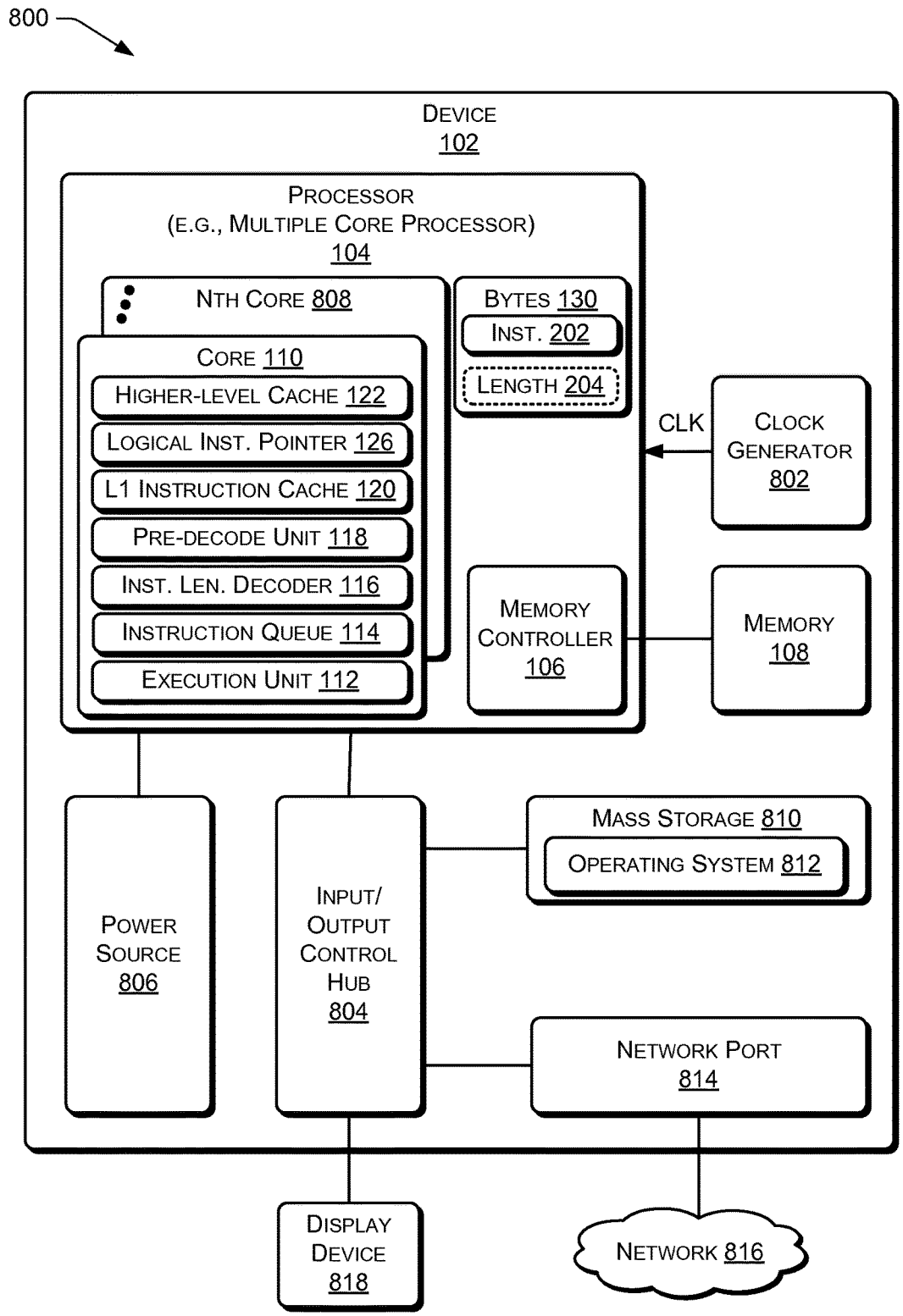
FIG. 8 illustrates an example framework 800 that includes an instruction length decoder to modify bytes in an instruction cache to include a length of an instruction according to some implementations

FIG. 8 illustrates an example framework 800 that includes an instruction length decoder to modify bytes in an instruction cache to include a length of an instruction according to some implementations. The framework 800 includes the device 102, which may be an electronic device, such as a desktop computing device, a laptop computing device, tablet computing device, netbook computing device, wireless computing device, and the like.

The device 102 may include one or more processors, such as the processor 104, a clock generator 802, the memory 108, an input/output control hub 804, and a power source 806 (e.g., a battery or a power supply). In some implementations, the processor 104 may include more than one core, such as a first core 110 and one or more additional cores, up to and including an $N^{th}$ core 808, where N is two or more. The processor 104 may include the memory controller 106 to enable access (e.g., reading from or writing) to the memory 108.

At least one core of the N cores 110 and 808 may include the execution unit 112, the instruction queue 114, the instruction length decoder 116, the pre-decode unit 118, the L1 instruction cache 120, the logical instruction pointer 126, and the higher-level cache 122 (e.g., L2 cache or LLC) of FIG. 1. When the instruction 202 is requested by the execution unit 112, the instruction length decoder 116 may read the bytes 130 from the L1 instruction cache using the logical instruction pointer 126, determine the length of the instruction 202, and modify one or more of the bytes 130 to include the length 204. When the instruction 202 is subsequently requested by the execution unit 112, the pre-decode unit 118 may determine that the bytes 130 include the length of the instruction 202, and decode the instruction 202 from the bytes 130 based on the length 204.

The clock generator 802 may generate a clock signal that is the basis for an operating frequency of one or more of the N cores 110 and 808 of the processor 104. For example, one or more of the N cores 110 and 808 may operate at a multiple of the clock signal generated by the clock generator 802.

The input/output control hub 804 may be coupled to mass storage 810. The mass storage 810 may include one or more non-volatile storage devices, such as disk drives, solid state drives, and the like. An operating system 812 may be stored in the mass storage 810.

The input/output control hub 804 may be coupled to a network port 814. The network port 814 may enable the device 102 to communicate with other devices via a network 816. The network 816 may include multiple networks, such as wireline networks (e.g., public switched telephone network and the like), wireless networks (e.g., 802.11, code division multiple access (CDMA), global system for mobile (GSM), Long Term Evolution (LTE) and the like), other types of communication networks, or any combination thereof. The input/output control hub 804 may be coupled to a display device 818 that is capable of displaying text, graphics, and the like.

As described herein, the processor 104 may include multiple computing units or multiple cores. The processor 104 can be implemented as one or more microprocessors, microcomputers, microcontrollers, digital signal processors, central processing units, state machines, logic circuitries, and/or any devices that manipulate signals based on operational instructions. Among other capabilities, the processor 104 can be configured to fetch and execute computer-readable instructions stored in the memory 108 or other computer-readable media.

The memory 108 is an example of computer storage media for storing instructions which are executed by the processor 104 to perform the various functions described above. The memory 108 may generally include both volatile memory and non-volatile memory (e.g., RAM, ROM, or the like). The memory 108 may be referred to as memory or computer storage media herein, and may be a non-transitory media capable of storing computer-readable, processor-executable program instructions as computer program code that can be executed by the processor 104 as a particular machine configured for carrying out the operations and functions described in the implementations herein. The processor 104 may include modules and components for identifying a length of an instruction of an instruction set that has variable length instructions according to the implementations herein.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

What is claimed is:
1. A processor that includes one or more cores, at least one core of the one or more cores comprising:
an instruction cache; and
a pre-decode unit to:
read a first byte from the instruction cache using a logical instruction pointer that points to the first byte in the instruction cache;

detect whether the first byte includes a length of an instruction;

in response to detecting that the first byte includes the length of the instruction, read the instruction from the instruction cache based on the length of the instruction; and in response to detecting that the first byte excludes the length of the instruction, detect the length of the instruction, and perform operations comprising modifying the first byte of the plurality of bytes to include the length of the instruction.

2. The processor of claim 1, wherein the pre-decode unit is further to perform operations comprising:

detecting whether the first byte includes a value;

extracting the value from the first byte in response to detecting that the first byte includes the value; and encoding the value based on an encoding scheme to create an encoded value.

3. The processor of claim 2, wherein the pre-decode unit is further to perform operations comprising modifying the first byte to include the encoded value.

4. The processor of claim 1, further comprising:

an instruction queue including a plurality of decoded instructions; and an execution unit capable of executing the plurality of decoded instructions.

5. The processor of claim 4, wherein the pre-decode unit is further to perform operations comprising placing the instruction in the instruction queue for execution by the execution unit.

6. The processor of claim 1, wherein the pre-decode unit is further to:

read a prefix byte of the instruction from the instruction cache using the logical instruction pointer that points to the first byte in the instruction cache;

wherein the prefix byte to modify a behavior of the instruction.

7. A system that includes one or more processors, at least one of the one or more processors comprising:

an instruction cache; and a pre-decode unit to:

read one or more bytes from the instruction cache starting at a byte pointed to by a logical instruction pointer, determine whether the one or more bytes include a length of an instruction, in response to detecting that the one or more bytes include the length of the instruction, extract the instruction from the one or more bytes based on the length, and in response to detecting that the one or more bytes exclude the length of the instruction, determine the length of the instruction, extract the instruction from the one or more bytes based on the length of the instruction, and modify the one or more bytes to include the length of the instruction.

8. The system of claim 7, further comprising:

an instruction queue to store instructions extracted from the instruction cache; and an execution unit to execute at least one of the instructions extracted from the instruction queue.

9. The system of claim 8, wherein the pre-decode unit is further to place the instruction in the instruction queue to enable the at least one of the one or more processors to execute the instruction.

10. The system of claim 7, wherein:

the one or more bytes include a prefix byte of the instruction.

11. A method comprising:

reading, at a pre-decode unit of a processor, a plurality of bytes from an instruction cache based on a logical instruction pointer;

detecting whether a first byte of the plurality of bytes identifies a length of an instruction; and in response to detecting that the first byte of the plurality of bytes excludes the length of the instruction, determining the length of the instruction, modifying the first byte of the plurality of bytes to include the length of the instruction, and extracting the instruction from the plurality of bytes based on the length of the instruction.

12. The method of claim 11, further comprising in response to detecting that the first byte of the plurality of bytes identifies the length of the instruction, extracting the instruction from the plurality of bytes based on the length of the instruction.

13. The method of claim 11, wherein the length of the instruction is determined based on rules.

14. The method of claim 11, further comprising:

detecting whether the first byte includes a value;

extracting the value from the first byte in response to detecting that the first byte includes the value;

encoding the value based on an encoding scheme to create an encoded value; and modifying the first byte of the plurality of bytes to include the encoded value.

15. The method of claim 11, further comprising placing the instruction in an instruction queue to enable execution of the instruction by an execution unit of the processor.

16. The method of claim 11, wherein detecting whether the first byte of the plurality of bytes identifies the length of the instruction comprises:

identifying one or more indicator bits associated with the first byte; and detecting whether the indicator bits indicate that the first byte includes the length of the instruction.

17. The method of claim 16, wherein a prefix of the instruction comprises the one or more indicator bits.

18. The method of claim 11, wherein the plurality of bytes comprise a prefix byte, the prefix byte to modify a behavior of the instruction.

* * * * *